(12) United States Patent
Lin

(10) Patent No.: US 10,070,734 B2
(45) Date of Patent: Sep. 11, 2018

(54) ANTI-PINCH DEVICE FOR AN ELECTRIC PRODUCT

(71) Applicant: TAICANG SHIYUAN GLOBLE SOURCE CO., LTD., Taicang, JiangSu (CN)

(72) Inventor: Chun-Sheng Lin, Taicang (CN)

(73) Assignee: Taicang Shiyuan Globle Source Co., Ltd, Taichung, JiangSu (CN)

( * ) Notice: Subject to any disclaimer, the term of this patent is extended or adjusted under 35 U.S.C. 154(b) by 585 days.

(21) Appl. No.: 14/698,699

(22) Filed: Apr. 28, 2015

(65) Prior Publication Data

US 2015/0342363 A1    Dec. 3, 2015

(30) Foreign Application Priority Data

May 30, 2014    (CN) .......................... 2014 1 0239608

(51) Int. Cl.
| | |
|---|---|
| A47C 31/00 | (2006.01) |
| F16M 11/04 | (2006.01) |
| A47C 20/04 | (2006.01) |
| A47C 1/02 | (2006.01) |
| A47C 1/024 | (2006.01) |
| A47C 1/032 | (2006.01) |

(52) U.S. Cl.
CPC .............. *A47C 31/00* (2013.01); *A47C 1/02* (2013.01); *A47C 1/0242* (2013.01); *A47C 1/03211* (2013.01); *A47C 20/041* (2013.01); *F16M 11/04* (2013.01); *F16M 2200/00* (2013.01)

(58) Field of Classification Search
CPC ......... A47C 31/00; A47C 1/02; A47C 1/0242; A47C 1/03211; A47C 20/041; F16M 11/04; F16M 2200/00
See application file for complete search history.

(56) References Cited

U.S. PATENT DOCUMENTS

2003/0222610 A1* 12/2003 Whinnery ............ G05B 19/232
318/362

* cited by examiner

*Primary Examiner* — Anita M King
(74) *Attorney, Agent, or Firm* — Stites & Harbison PLLC; Richard S. Myers, Jr.

(57) ABSTRACT

The invention provides an anti-pinch device for an electric product. The electric product comprises a fixing seat, a moving part which is movable to or away from the fixing seat, and a driving mechanism for driving the movement of the moving part relative to the fixing seat. The anti-pinch device comprises a safety strip and a controller electrically connected to the safety strip for controlling the operating state of the driving mechanism. An anomaly monitoring circuit is disposed in the safety strip, and the anomaly monitoring circuit comprises a power supply, a resistance and a normally open switch connected in series, the normally open switch is closable when the safety strip is pressed. The controller is connected to the anomaly monitoring circuit by electrical signals. the safety strip is fixedly disposed on the moving part or fixing seat and located between them.

8 Claims, 3 Drawing Sheets

ANTI-PINCH DEVICE FOR AN ELECTRIC PRODUCT

CROSS REFERENCE TO RELATED APPLICATIONS

This application claims the benefit of People's Republic of China application Serial No. CN201410239608.X filed on May 30, 2014, under 35 USC Sec. 119(a) hereby specifically incorporated by reference in its entirely.

FIELD OF THE INVENTION

The present invention relates to an anti-pinch device for an electric product.

DESCRIPTION OF THE RELATED ART

Currently there exist some safety problems in many electric products. For example, for an electrically elevated bed, a bed plate is elevated relative to a bed frame, a baby or an animal will be harmed, or alternatively an article will be damaged when they fall into between the bed plate and the bed frame, meanwhile, the normal use of the electrically elevated bed will be affected.

Furthermore, there also exists the above problem in other electric products, such as an electric massage chair and an electric television frame, this will cause the potential risks during the use of the electric products.

SUMMARY OF THE INVENTION

An object of the invention is to provide an anti-pinch device for an electric product, which is safe, reliable, and simple in structure, thereby improving the safety of the electric product.

For the above purpose, the following technical so titian is utilized:

An anti-pinch device for an electric product, the electric product comprising
- a fixing seat;
- a moving part, which is movable to or away from the fixing seat, and
- a driving mechanism for driving the movement of the moving part relative to the fixing seat,
- wherein the electric product is provided with the anti-pinch device, and the anti-pinch device comprising:
  - a safety strip which is fixedly disposed on the moving part or fixing seat and located between them, the safety strip being provided with an anomaly monitoring circuit therein, the anomaly monitoring circuit comprising a power supply, a resistance and a normally open switch connected in series, and the normally open switch is closable when the safety strip is pressed; and
  - a controller which is electrically connected to the safety strip for controlling the operating state of the driving mechanism, and the controller being connected to the anomaly monitoring, circuit by electrical signals.

Preferably, the safety strip comprises two copper wires parallel to each other, and the power supply is connected in series with one of the two copper wires.

Preferably, the driving mechanism comprises a motor.

More preferably, the electric product is an electrically elevated bed comprising a bed frame and a bed plate disposed on the bed frame, the bed plate at least comprises a backrest plate rotatable relative to the bed frame. The fixing seat is the bed frame, the moving part is the backrest plate, and the safety strip is disposed on a side of the backrest plate facing to the fixing seat.

Still more preferably, the bed frame also comprises a leg supporting plate rotatable relative to the bed frame, and the safety strip also is disposed between the lee supporting plate and the bed frame.

Preferably, the electric product is an electric chair comprising a chair seat and a chair backrest rotatably disposed on the chair seat relative to the chair seat. The fixing seat is the chair seat, the moving part is the chair backrest, and the safety strip is disposed on a side of the chair backrest facing to the chair seat.

More preferably, the electric chair also comprises a foot pad rotatably disposed on the chair seat relative to the chair seat, and the safety strip also is disposed between the foot pad and the chair seat.

Still more preferably, the electric product is an electric television frame comprising a base seat, a lifting frame fixedly disposed on the base seat, and as television frame which is disposed on the lifting frame and can be elevated up and down, and the safety strip is disposed on the lifting frame at a location adjacent to the base seat.

Due to the above technical solution, the present invention has the following advantages as compared with the prior art in the invention, by using the anti-pinch device disposed between the fixing seat and the moving part displaceable relative to each other, and by using the safety strip disposed on one of the fixing seat and the moving part, the safety strip will be pressed during the movement of the moving part towards the fixing seat when a foreign matter is located between the luring seat and the moving part, so that the anomaly monitoring circuit in the safety strip is turned on, and the voltage signals or current signals from the circuit are received by the controller, thereby making the motor stop rotating and further rotate inversely such that the moving part moves away from the fixing seat, and this will help to take out the clamped foreign matter. The anti-pinch device of the invention has a simple and lowcost structure, and can be extensively applied in various electric products, such as an electrically elevated bed, an electric chair and an electric television frame, and thus the safety of such electric products is efficiently improved.

wherein: 1. a safety strip; 11. a safety monitoring circuit; 12. a normally open switch; 13. a resistance; 2. a controller: 3. a motor; 10. a bed frame (fixing seat); 20. a bed plate: 201. a backrest plate (moving part); 202. a shank plate (moving part); 203. a thigh plate (moving part); 30. a chair seat (fixing seat); 40. a chair backrest (moving part); 50. a foot pad (moving part); 60. a base seat (fixing seat); 70. a lifting frame; 80. a television frame (moving part).

DESCRIPTION OF THE PREFERRED EMBODIMENTS

The technical solution of the invention is further detailedly illustrated in connection with the accompanying drawings and specific embodiments.

Embodiment 1

Figure 1:
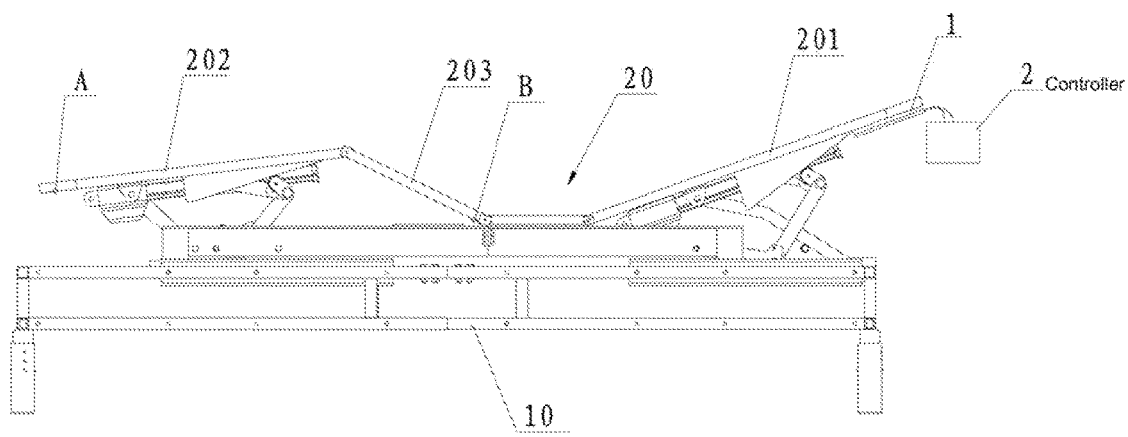
FIG. 1 is a schematic drawing showing the embodiment 1 of the invention.

As shown in FIG. 1, an electrically elevated bed comprises a bed frame 10 and a bed plate 20 disposed on the bed frame 10. The bed plate 20 at least comprises a backrest plate 201, which is rotatably disposed on the bed frame 10 relative to the bed frame 10 in order to meet the requirement of a user desiring to lean on it at different angles.

A driving mechanism (not shown) is disposed between the bed frame 10 and the backrest plate 201 for driving the rotation of the backrest plate 201 relative to the bed frame 10, and here the driving mechanism is provided as a motor 3. If the backrest plate 201 declines to a lowest position relative to the bed frame 10, there shall be a certain gap between them.

The electrically elevated bed is also provided with an anti-pinch device, to prevent a foreign matter from being clamped between the backrest plate 201 and the bed frame 10 in the course of the backrest plate 201 rotating towards the bed frame 10. The anti-pinch device comprises a safety strip 1 fixedly disposed on the backrest plate 201 and a controller 2 which is electrically connected to the safety strip 1 for controlling the operating state of the motor 3. The safety strip 1 is disposed on a side of the backrest plate 201 facing to the bed frame 10, and it certainly also can be disposed on a side of the bed frame 10 facing to the backrest plate 201.

Figure 2:
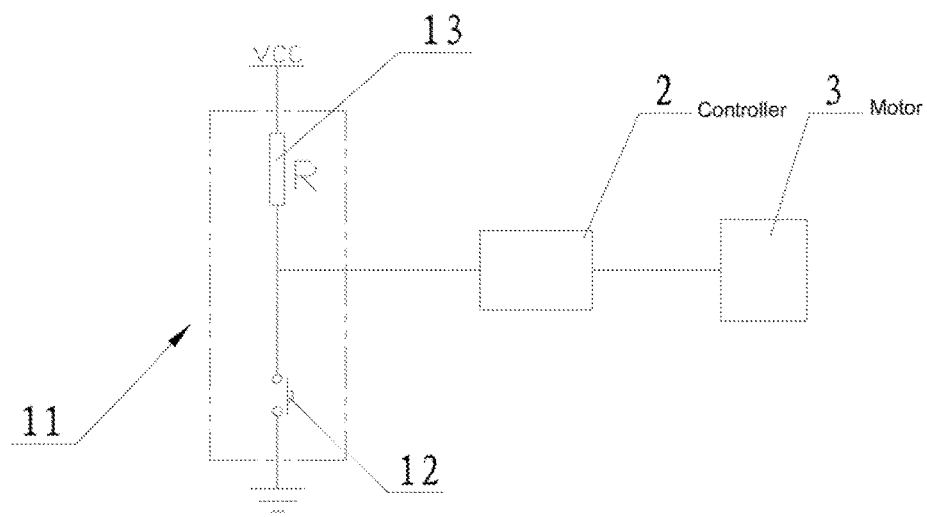
FIG. 2 is a schematic drawing showing the working principle of the anti-pinch device of the embodiment 1.

As shown in FIG. 2, the safety strip 1 is provided with an anomaly monitoring circuit 11 therein, and the anomaly monitoring circuit 11 is connected to the controller 2 by electrical signals. The anomaly monitoring circuit 11 comprises a power supply (not shown), a resistance 13 and a normally open switch 12 which are connected to each other in series. When the safety strip is 1 pressed, the normally open switch 12 can be pressed down such that the anomaly monitoring circuit 11 is turned on. When the anomaly monitoring circuit 11 is turned on, the controller 2 can receive voltage signals or current signals from the anomaly monitoring circuit 11, and further make the motor 3 stop rotating and further rotate inversely.

The safety strip 1 can be configured to comprise two copper wires parallel to each other and a power supply connected to one of the two parallel copper wires in series, thereby forming the anomaly monitoring circuit 11. When the safety strip 1 is pressed, the two copper wires contacts with each other, and this means that the normally open switch 12 is pressed down, the copper wires themselves form the resistance 13, and the anomaly monitoring circuit 11 is turned on therefrom.

In this way, when there exists no any foreign matter between the backrest plate 201 and the bed frame 10, or the height of the foreign matter is less than that of the gap between the backrest plate 201 and the bed frame 10, the backrest plate 201 can normally rotate down relative to the bed frame 10 and the safety strip 1 will not be pressed. When a larger foreign matter is located between the backrest plate 201 and the bed frame 10, such as an animal, a child or any other article, in the course of the backrest plate 201 rotating down towards the bed frame 10 under the action of the motor 3, when the backrest plate 201 presses the above foreign matter, the safety strip 1 is pressed and the normally open switch 12 is pressed down, such that the anomaly monitoring circuit 11 is turned on the voltage signals or current signals are received by controller 2 from the anomaly monitoring circuit 11, and the controller 2 controls the motor 3 to stop rotating and further rotate inversely, such that the backrest plate 201 rotates upwards at a certain angle in a direction away from the bed frame 10, thereby releasing the foreign matter such that it can be conveniently taken out by a user.

Referring again to FIG. 1, the bed plate 20 also comprise as leg supporting plate rotatable relative to the bed frame 10, the leg supporting plate comprises a thigh plate 203 and a shank plate 202. In order to avoid the case that a foreign matter is clamped between the shank plate 202 and the bed frame 10, or between the thigh plate 203 and the bed frame 10, the above anti-pinch device also can be provided at the location A and B in FIG. 1, or alternatively the safety strip 1 may also be provided on the bed frame 10 corresponding to the location A or B to reach the anti-pinch effect.

Embodiment 2

Figure 3:
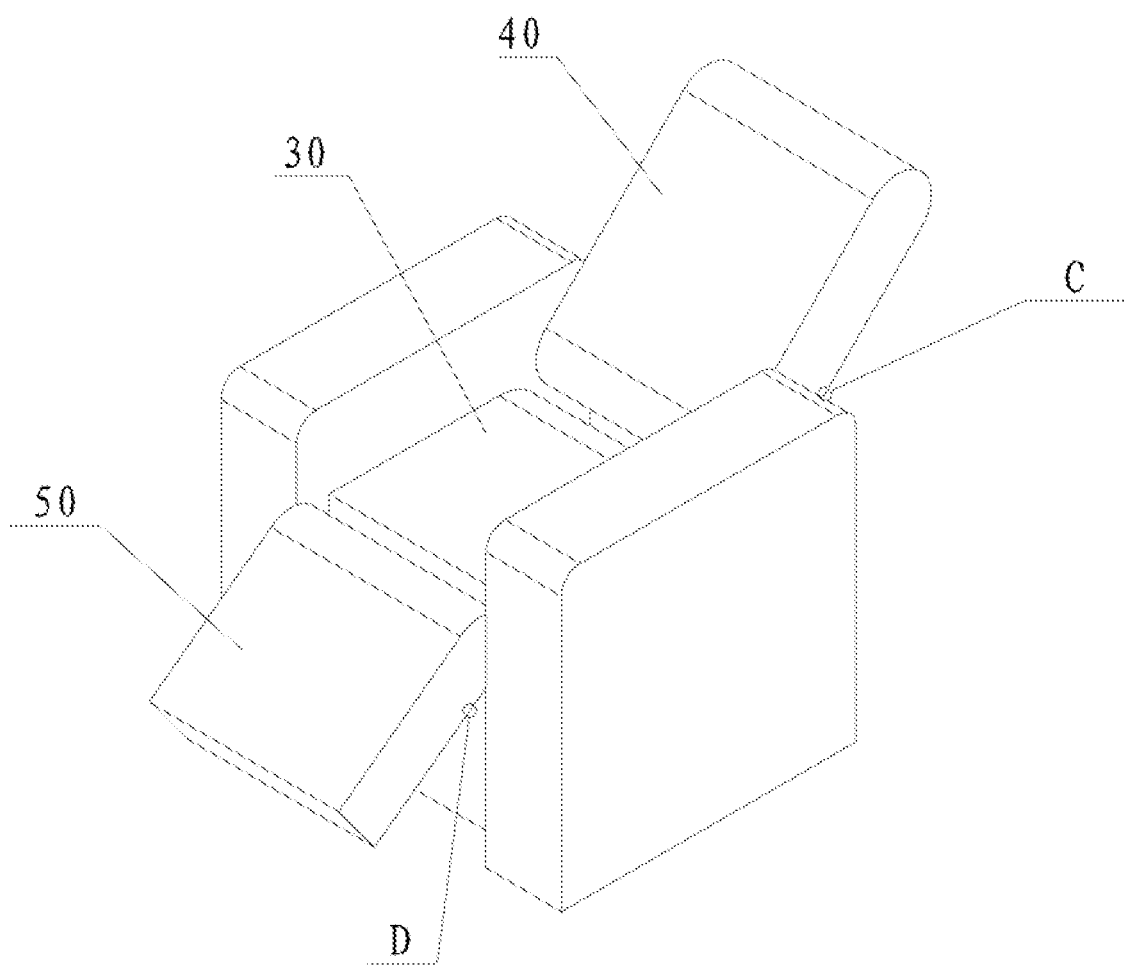
FIG. 3 is a schematic drawing showing the embodiment 2 of the invention.

An electric chair is as illustrated in FIG. 3. The electric chair comprises a chair seat 30, a chair backrest 40 rotatably disposed on the chair seat 30 relative to the chair seat 30, and a foot pad 50 rotatably disposed on the chair seat 30 relative to the chair seat 30. Considering the case that a foreign matter generally is easily clamped between the chair backrest 40 and the chair seat 30, or clamped between the food pad 50 and the chair seat 30, in this embodiment, anti-pinch devices respectively are disposed at the locations C and D, thereby ensuring the safety of the electric chair.

Embodiment 3

Figure 4:
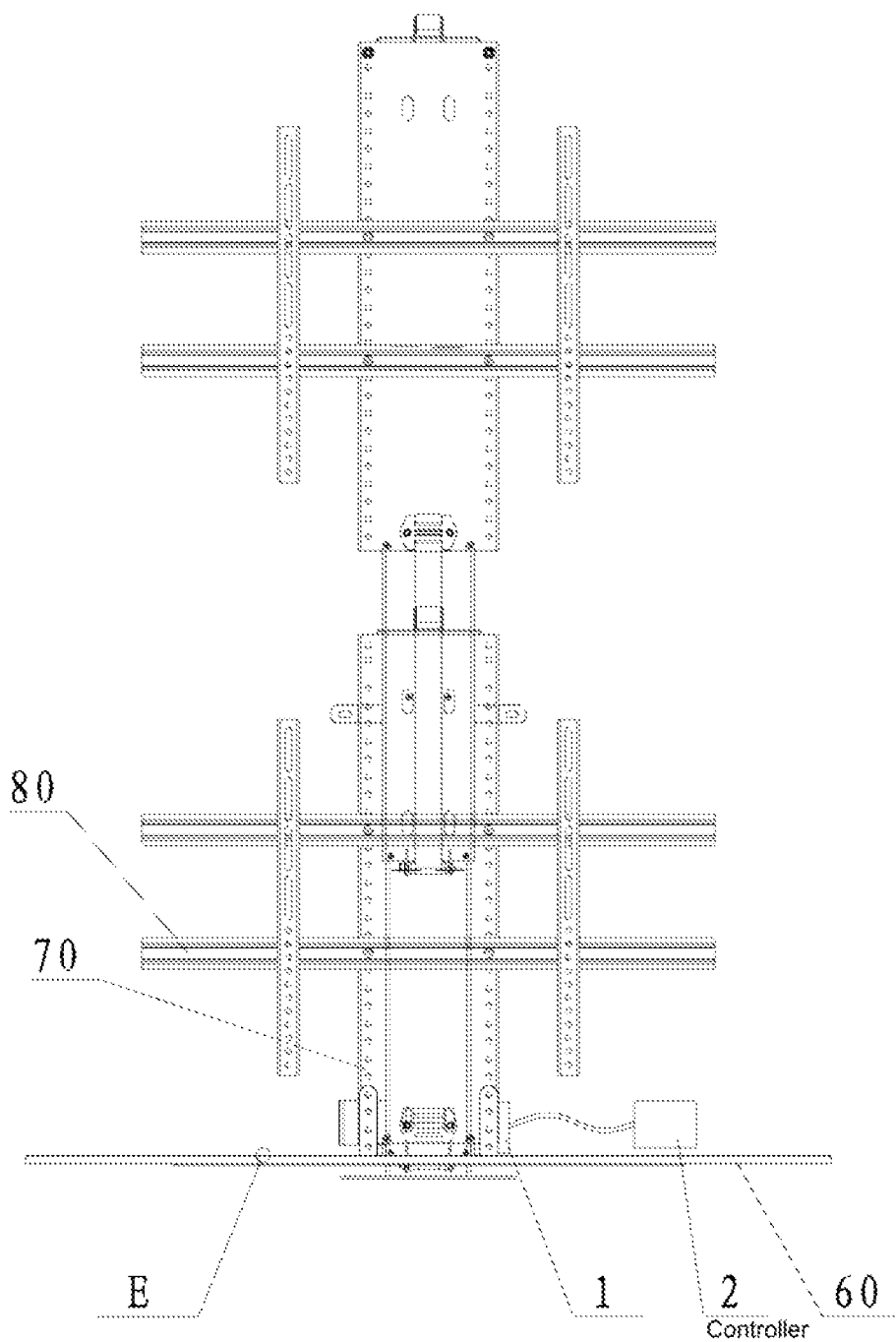
FIG. 4 is a schematic drawing showing the embodiment 3 of the invention.

An electric television frame is as illustrated in FIG. 4. The electric television frame comprises a base seat 60, a lifting frame 70 fixedly disposed on the base seat 60, and a television frame 80 which is disposed on the lifting frame and can be elevated up and down. The television frame 80 is used for mounting a television. In the course of the television frame 80 declining relative to the base seat 60, a foreign matter may be easily clamped between them, in this embodiment, a safety strip 1 is disposed on the lifting frame 70 at a location adjacent to the base seat 60 to avoid the case that a foreign matter is clamped between the television frame 80 and the base seat 60. Certainly, the safety strip 1 may also be disposed on the base seat 60 at a location E, this also can reach the anti-pinch effect.

In conclusion, in the invention, by using the anti-pinch device disposed between the fixing seat and the moving part displaceable relative to each other, and by using the safety strip 1 disposed on one of the fixing seat and the moving part, the safety strip 1 will be pressed during the movement of the moving part towards the fixing seat when a foreign matter is located between the fixing seat and the moving part, so that the anomaly monitoring circuit 11 in the safety strip 1 is turned on, and the voltage signals or current signals from the circuit are received by the controller 2, thereby making the motor stop rotating and further rotate inversely such that the moving part moves away from the fixing seat, and this will help to take out the clamped foreign matter. The anti-pinch device of the invention has a simple and lowcost structure, and can be extensively applied in various electric products, such as an electrically elevated bed, an electric chair and an electric television frame, and thus the safety of such electric products is efficiently improved.

The above embodiments are described for illustrating the technical concept and features of invention, the aim is intended to enable a person skilled in the art to appreciate the content of the invention and further implement it, and the protecting scope of the invention can not be limited hereby. Also, any equivalent variations or modifications made according to the spirit of the invention should be covered within the protecting scope of the invention.

What is claimed is:

1. An electric product, the electric product comprising an anti-pinch device;
a fixing seat;
a moving part, which is movable to or away from the fixing seat; and
a driving mechanism for driving the movement of the moving part relative to the fixing seat,
wherein the anti-pinch device comprises:
a safety strip which is fixedly disposed on the moving part or fixing seat and located between them, the safety strip being provided with an anomaly monitoring circuit therein, the anomaly monitoring circuit comprising a power supply, a resistance and a normally open switch connected in series, and the normally open switch is closable when the safety strip is pressed; and
a controller which is electrically connected to the safety strip for controlling the operating state of the driving mechanism, and the controller being connected to the anomaly monitoring circuit by electrical signals.

2. The electric product as claimed in claim 1, wherein the safety strip comprises two copper wires parallel to each other, and the power supply which is connected in series with one of the two copper wires.

3. The electric product as claimed in claim 1, wherein the driving mechanism comprises a motor.

4. The electric product as claimed in claim 1, wherein the electric product is an electrically elevated bed comprising a bed frame and a bed plate disposed on the bed frame, the bed plate at least comprising a backrest plate rotatable relative to the bed frame, the fixing seat being the bed frame, the moving part being the backrest plate, and the safety strip being disposed on a side of the backrest plate facing to the fixing seat.

5. The electric product as claimed in claim 4, wherein the bed frame also comprises a leg supporting plate rotatable relative to the bed frame, and the safety strip also being disposed between the leg supporting plate and the bed frame.

6. The electric product as claimed in claim 1, wherein the electric product is an electric chair comprising a chair seat and a chair backrest rotatably disposed on the chair seat relative to the chair seat, the fixing seat being the chair seat, the moving part being the chair backrest, and the safety strip being disposed on a side of the chair backrest facing to the chair seat.

7. The electric product as claimed in claim 6, wherein the electric chair also comprises a foot pad rotatably disposed on the chair seat relative to the chair seat, and the safety strip also being disposed between the foot pad and the chair seat.

8. The electric product as claimed in claim 1, wherein the electric product is an electric television frame comprising a base seat, a lifting frame fixedly disposed on the base seat, and a television frame which is disposed on the lifting frame and can be elevated up and down, and the safety strip being disposed on the lifting frame at a location adjacent to the base seat.

* * * * *